United States Patent [19]

Maeda

[11] Patent Number: 5,012,374
[45] Date of Patent: Apr. 30, 1991

[54] RECORDING AND/OR REPRODUCING APPARATUS IN WHICH THE POSITION OF HEAD MEANS RELATIVE TO THE RECORD BEARING MEDIUM IS CONTROLLED BETWEEN TWO POSITIONS

[75] Inventor: Masaya Maeda, Kanagawa, Japan

[73] Assignee: Canon Kabushiki Kaisha, Tokyo, Japan

[21] Appl. No.: 446,435

[22] Filed: Dec. 5, 1989

Related U.S. Application Data

[62] Division of Ser. No. 245,997, Sep. 14, 1988.

[30] Foreign Application Priority Data

| Jul. 20, 1983 | [JP] | Japan | 58-132536 |
| Jul. 20, 1983 | [JP] | Japan | 58-132537 |
| Jul. 20, 1983 | [JP] | Japan | 58-132538 |
| Jul. 20, 1983 | [JP] | Japan | 58-132539 |
| Jul. 20, 1983 | [JP] | Japan | 58-132540 |
| Jul. 20, 1983 | [JP] | Japan | 58-132541 |

[51] Int. Cl.$^5$ .............. G11 5/55; G11 5/56; G11 21/08; G11 21/12
[52] U.S. Cl. .............. 360/109; 360/105; 360/106
[58] Field of Search .............. 360/109, 106, 105

[56] References Cited

U.S. PATENT DOCUMENTS 4,110,803  8/1978  Townsend .............. 360/109

FOREIGN PATENT DOCUMENTS 2943409  5/1980  Fed. Rep. of Germany .

Primary Examiner—Robert S. Tupper
Attorney, Agent, or Firm—Toren, McGeady & Associates

[57] ABSTRACT

An apparatus, arranged to use a disc-shaped record bearing medium, is provided with a transducing head, a mechanism for moving the head relative to the medium, and a control device for selectively controlling the head between two positions relative to the record bearing medium.

16 Claims, 7 Drawing Sheets

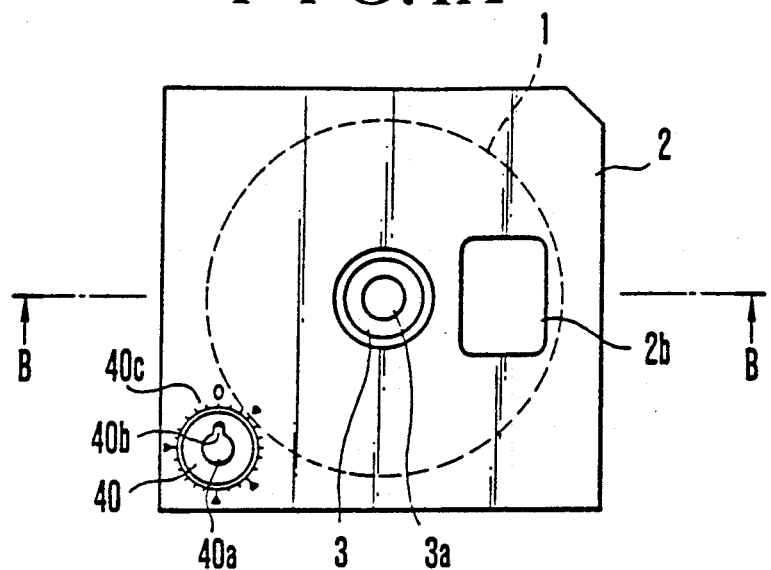
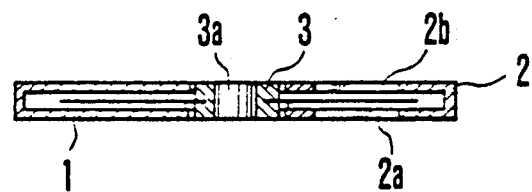
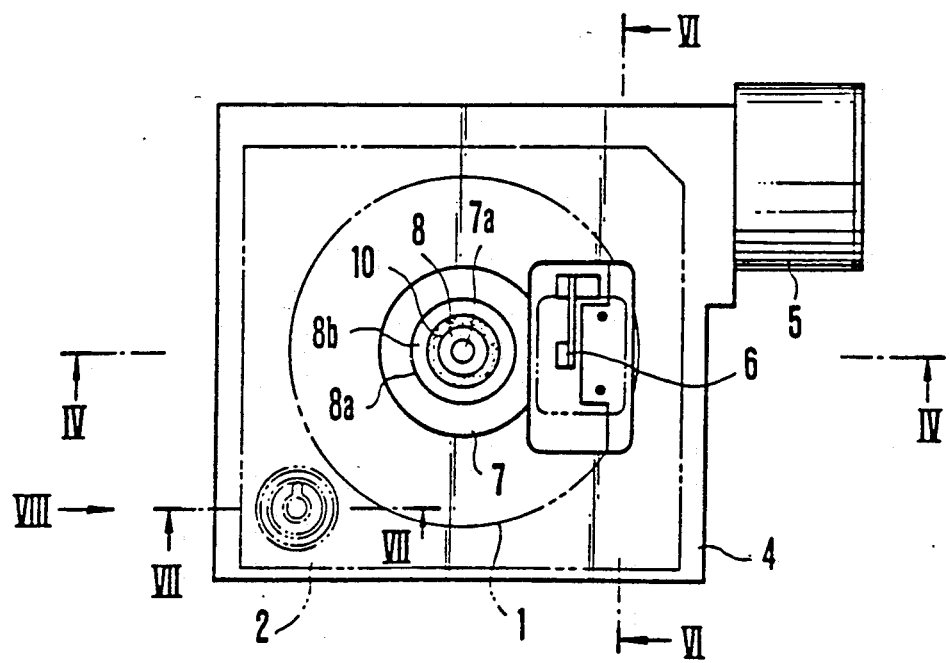

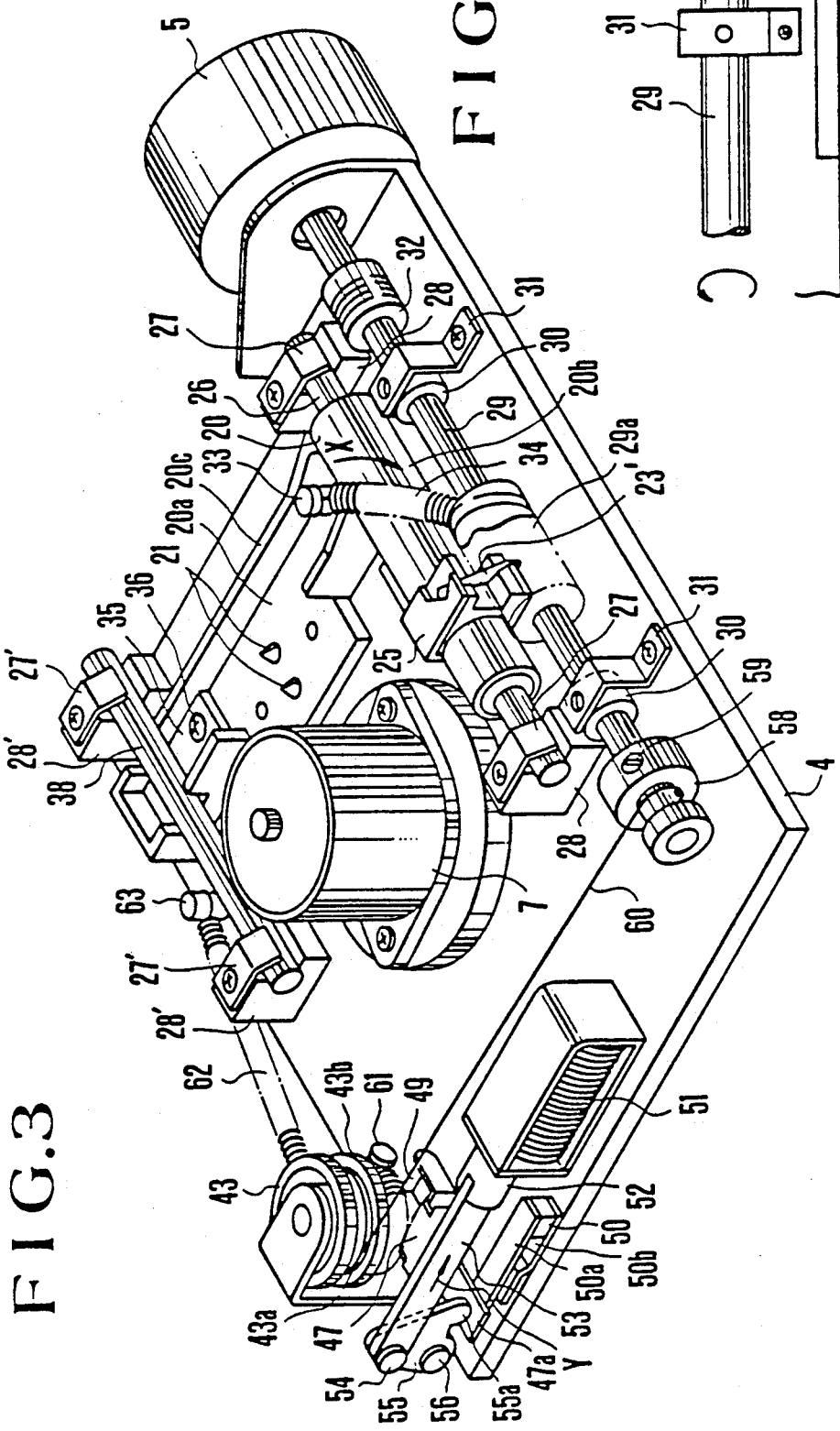

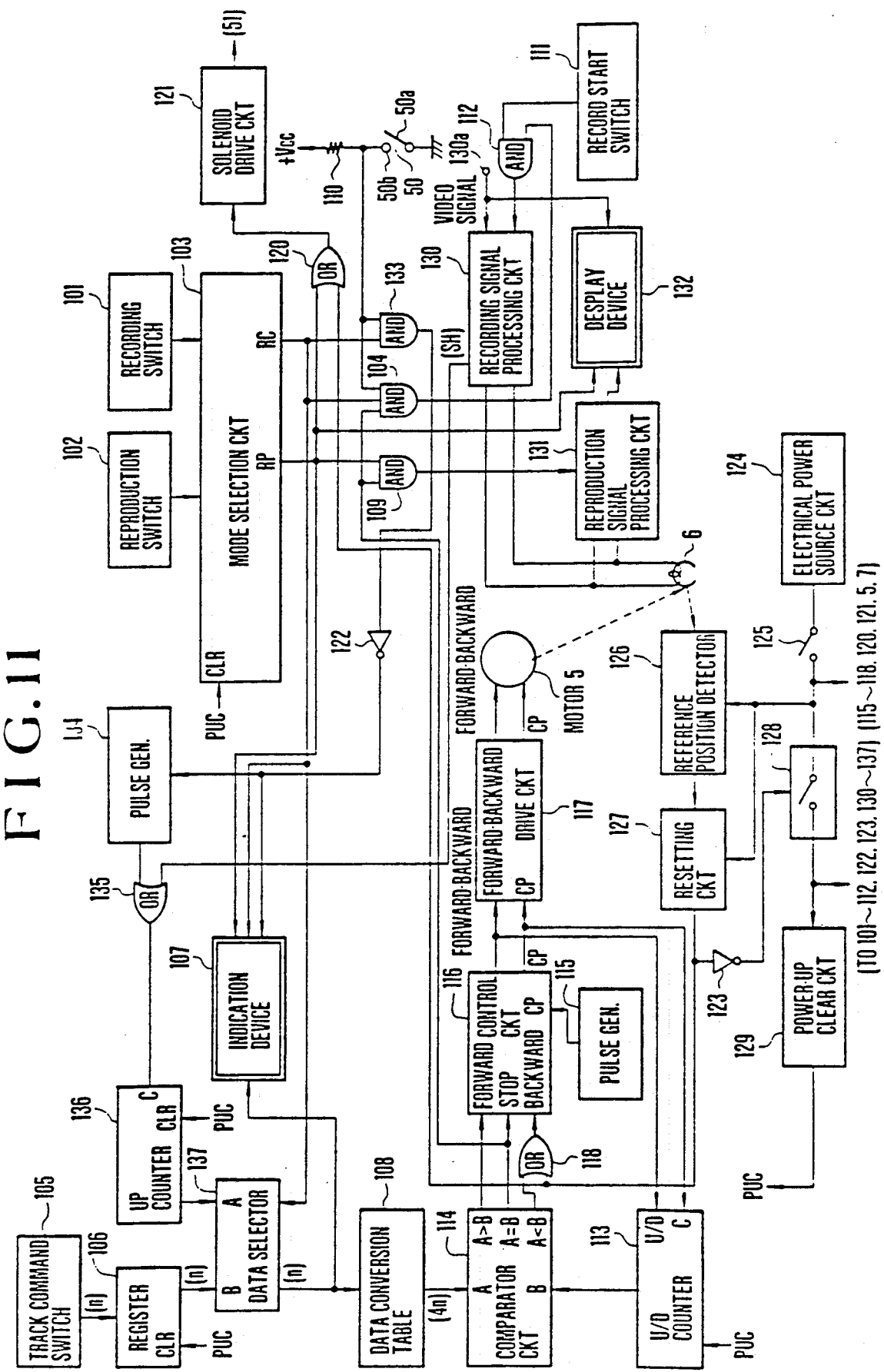

RECORDING AND/OR REPRODUCING APPARATUS IN WHICH THE POSITION OF HEAD MEANS RELATIVE TO THE RECORD BEARING MEDIUM IS CONTROLLED BETWEEN TWO POSITIONS

This is a divisional application of Ser. No. 07/245,997, filed Sept. 14, 1988.

BACKGROUND OF THE INVENTION

1. Field of the Invention

The present invention relates to a recording and/or reproducing apparatus and, more particularly, to a recording and/or reproducing apparatus arranged to use a record bearing medium housed in a container which is provided with a counter device for indicating an amount of recorded information or the remnant recording capacity of the medium.

2. Description of the Prior Art

In the field of the art of recording and/or reproducing apparatus using, for example, flexible magnetic discs in cassettes and recording video signals representing still pictures on the magnetic disc contained in this disc cassette and/or reproducing the video signals from the disc, there has been a proposal for equipping the disc cassette with a counter device for indicating the amount of recorded information, namely, video signals (or the number of recorded tracks), on the disc, or the remnant recording capacity of the disc. And, in this case, the recording and/or reproducing apparatus adapted to use the cassette equipped with such counter device has to be equipped with counter drive means for driving the counter device of the cassette in response to the movement of a recording and/or reproducing magnetic head relative to the disc by head moving means.

In case the apparatus, using the cassette equipped with the counter device, is made to operate with the selection of the recording and reproducing modes, it is in the recording mode of the apparatus that the counter drive means must be enabled, but in the reproducing mode, this counter drive means must be disabled. In other words, if the counter drive means is left enabled even in the reproducing mode, it results that the counter device of the cassette is driven to move in response to the movement of the head for reproducing. This causes the indicated value of the counter device before the reproduction, that is, the memorized information concerning the amount of recorded signals or the position for the next signal recording on the disc, to shift at random. Then, when it is desired to proceed with the next recording operation, the counter device-of which the indicated value concerning the amount of recorded signals or where the preceding recording operation ended is uncertain-no longer assists the operator in making sure that recording starts from the position next to the last of the recorded tracks on the disc. Therefore, a problem arises in that, for example, double recording of signals may place on some of the recorded tracks, or that the next recording operation is initiated at a position spaced by a longer distance than necessary beyond the last recorded track.

Additionally, such a recording and/or reproducing apparatus has many other features which can be improved in respect to, for example, the construction and arrangement of the head moving means, or the various kinds of adjustment of the head to the magnetic disc.

SUMMARY OF THE INVENTION

A general object of the present invention is to provide a novel recording and/or reproducing apparatus which can solve the conventional problems and drawbacks.

Another object of the invention is to provide an apparatus arranged to use a record bearing medium housed in a container which is provided with a counter device for indicating an amount of recorded information or the remnant recording capacity of the medium wherein the counter device of the container is deactivated when use thereof is unnecessary.

Thus, according to an embodiment of the invention, the apparatus comprises transducing head means, moving means for moving the head means relative to the medium, drive means for driving the counter device of the container in response to the movement of the head means, and control means for selectively coupling and decoupling the drive means from the counter device.

In case the apparatus is embodied as a recording and reproducing apparatus, the control means may preferably be arranged to couple the drive means to the counter device in the recording mode and to decouple the drive means from the counter device in the reproducing mode.

Thereby, for example, in a situation where recording and reproducing operations alternate with the use of a common recording medium housed in the container, when it is desired to perform recording, the counter device is rendered operative to indicate the amount of recorded area (or recording position) or the amount of area left unrecorded, and then when it is desired to perform reproduction, the counter device is rendered inoperative to hold the contents of the counter device so that it remains unchanged from that value of the amount of recorded area (recording position) or the amount of fresh area which has been indicated at the termination of the preceding recording operation. When it is desired to proceed to the next recording operation, therefore, there is no possibility of occurrence of either an overlapping recording of information on the recorded area of the recording medium or a blank area between the recorded area and an area to be thereafter recorded.

Still another object of the present invention is to provide a recording and/or reproducing apparatus, using a recording medium housed in a container equipped with a counter device as has been described above, with a counter drive mechanism which improves the spacing factor of recorded information and allows for a quick and easy operation of establishing the phase coincidence between the counter device of the container and the head means of the apparatus.

Thus, in an embodiment according to another aspect of the present invention, there is provided a recording and/or reproducing apparatus in which a wire belt is trained between the drive means for driving the counter device of the container and a capstan connected to the head moving means, and it is through this wire belt that rotation of the capstan dependent on the movement of the head means is transmitted to the drive device.

Thereby, the space factor is heightened, and adjusting the setting angle of the driven capstan with the head moving means becomes a simple operation. Thus, the phase adjustment of the drive for the counter becomes easy.

A further object of the present invention is to provide a recording and/or reproducing apparatus in which rotation of a motor driven screw shaft is converted to a straight linear movement of a head carriage along an axis of said screw shaft, wherein an engaging pin for coupling the screw shaft with the head carriage to transmit a driving power can be clamped simply without using a bolt and nut while nevertheless permitting the clamping operation to be carried out with very high accuracy and reliability.

Thus, in an embodiment according to another aspect of the present invention, a clamping device for the engaging pin is provided in the form of a support member having two hooked portions and pivotally mounted on the head carriage. This support member is made of an elastic material such as a leaf spring so that an elastic deformation in part of the support member exerts a force by which the engaging pin is pressed against a reference surface of the head carriage.

A further object of the invention is to provide a recording and/or reproducing apparatus in which a head carriage with a head mounted thereon is made to linearly move along a guide shaft as a screw shaft rotates so that the head moves relative to the recording medium, wherein the use of simple means suffices for preventing centrifugal whirling of the shaft of the head carriage thereby improving the accuracy of linear movement of the head.

Thus, in an embodiment according to another aspect of the invention, there is provided a recording and/or reproducing apparatus with a setting-aside spring helically trained around a portion of the head carriage to thereby exert a force acting not only in a direction to remove the backlash of the head carriage relative to the screw shaft and to turn the head carriage about the guide shaft, but also in a radial direction of the guide shaft, whereby the radial play between a bearing portion of the aforesaid head carriage and the aforesaid guide shaft is absorbed.

Another object of the invention is to provide a recording and/or reproducing apparatus with a head adjusting mechanism which allows for independent adjustment of the amount of projection of the head toward the recording medium to be determined without regard to other elements of the attitude of the head, such as eccentricity and inclination.

Thus, in an embodiment according to another aspect of the invention, there is provided a recording and/or reproducing apparatus in which the head carriage is arranged to be rotatable about the guiding axis for linear movement thereof, whereby the position of the head can be adjusted in a direction to project toward or retract from the recording medium.

Another object of the invention is to provide a recording and/or reproducing apparatus with a head adjusting mechanism which allows for adjusting operations of the head in the azimuth direction and in a direction perpendicular to the recording track to be carried out independently of each other without interference with each other.

Thus, according to another embodiment of the invention, there is provided a recording and/or reproducing apparatus in which a base plate holding the head is supported on the carriage by two pivots to be rotatable about a line passing through the two pivots, and the height of one of the two pivots from the other is made adjustable, so that the azimuth adjustment of the head can be controlled by turning the base plate about the line across the two pivots, and the shift adjustment of the head across the recording tracks can be controlled by varying the relative height of one of the two pivots.

Other objects and features of the invention will become apparent from the following detailed description of the embodiments thereof by reference to the accompanying drawings.

Although the embodiments of the invention will be described in connection with a recording medium which is a magnetic disc, it is to be understood that the present invention is not confined thereto, and is applicable to other types of recording media, such as, the optical type, static capacitance type and mechanical type having a disc shape, drum shape or band shape with reasonable modifications. Further, information which may be recorded is not only in the form of video signals, but also data, etc.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

BRIEF DESCRIPTION OF THE DRAWINGS

In the drawings:

FIG. 1A is a plan view of a magnetic disc cassette usable with the invention, and FIG. 1B is a sectional view taken along line B—B in FIG. 1A.

FIG. 2 is a plan view, looking from the direction in which the cassette is inserted, of the main parts of an embodiment of the invention.

FIG. 3 is a perspective view of the recording and reproducing apparatus of FIG. 2, and FIG. 3A is an elevational view of the main parts of a head advancing mechanism where the output shaft of an electric motor is perpendicular to a screw shaft.

7 is a sectional view taken along line VII—VII of a part of the apparatus of FIG. 2.

Figure 8:
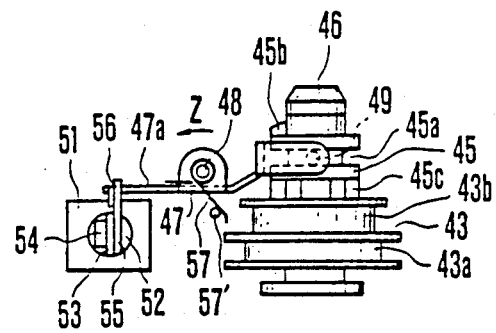

FIG. 8 is a side elevational view looking from the direction VIII of the main parts of the recording and reproducing apparatus of FIG. 2.

Figure 9:
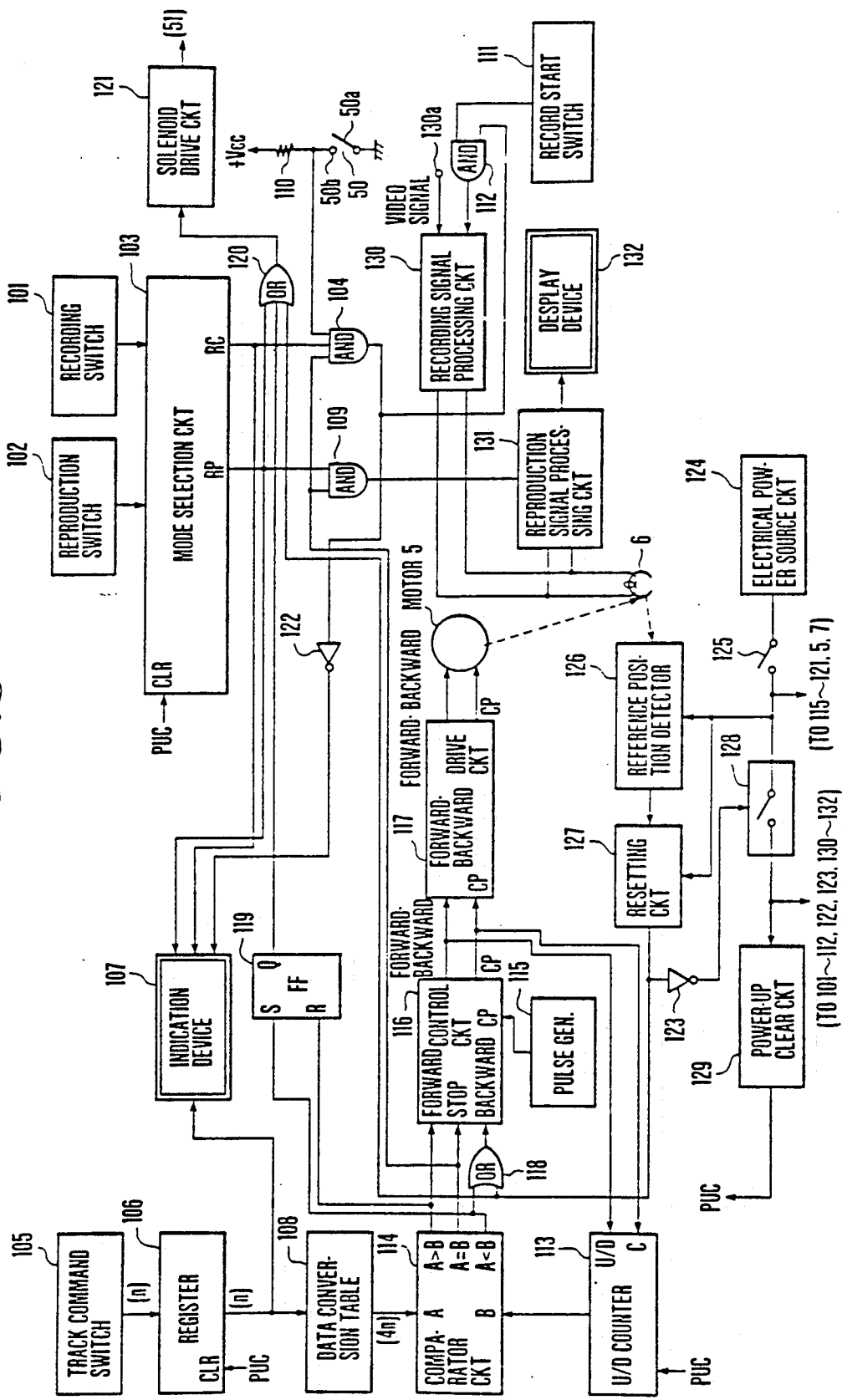

FIG. 9 is a block diagram illustrating an example of an electrical circuit system of the apparatus.

Figure 10:
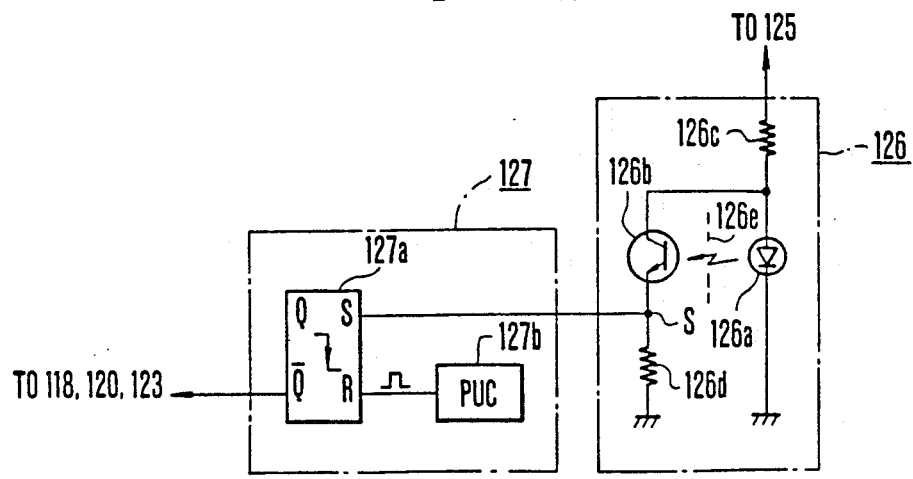

FIG. 10 is an electrical circuit diagram illustrating the details of the reference position detector and resetting circuit of FIG. 9.

FIG. 11 is a block diagram illustrating another example of the electrical circuit system of the apparatus.

DETAILED DESCRIPTION OF THE PREFERRED EMBODIMENTS

In FIG. 1A, 1 is a magnetic disc comprising the record bearing medium, and 2 is a magnetic disc cassette operating as a record bearing medium accommodating container formed in a flat box shape. In this cassette 2, there is housed the magnetic disc 1. At the center of the area of the magnetic disc 1, there is fixedly secured a center core 3 having a central hole 3a into which there may be inserted a disc rotating spindle 8 coaxially fixed to an output shaft 7a of a disc motor 7 (see FIG. 4). Therefore, the magnetic disc 1 and center core 3 rotate as a unit when a driving torque of the disc motor 7 is transmitted thereto. A counter 40 is rotatably supported on a portion of the housing of the cassette 2, and operates with a click mechanism (not shown) to indicate the number of recorded tracks, or recording location (or the remaining recordable capacity). The counter 40 has a central hole 40a into which a counter driving spindle 45 (see FIGS. 7 and 8) is inserted with its key 45b in registry with a key groove 40b formed in the counter hole 40a. This key groove 40b also serves as a pointer cooperating with a track number scale 40c provided on a panel of the housing of the cassette 2. Assuming that on the magnetic disc 1, 50 record tracks are settable, then more than 50 click teeth are formed in the outer periphery of the counter 40 at a region within 360°. As a magnetic transducing head 6 shown in FIGS. 3 to 6 moves from the first track nearest to the outer periphery of the magnetic disc 1 to the 50th track nearest to the center core 3 thereof, the number of recorded tracks or the track number is indicated by the key groove 40b on the scale 40c in one-to-one relation to the positions of a head carriage 20.

As shown in detail in FIG. 1B, the cassette 2 housing is provided with windows 2a and 2b formed in the housing panel which confronts the magnetic head 6 and an opposite housing panel respectively, in alignment to each other, the housing covering all the magnetic disc 1 except at these windows 2a and 2b. The cassette 2 containing the magnetic disc 1 is loaded by a mechanism (not shown) in such a way that the magnetic head 6 enters through the window 2a to face with the recording surface of the magnetic disc 1. The magnetic disc 1 is rotated by the disc motor 7 of FIG. 4 at a speed equal to an integer multiple of the field frequency of standard TV signals so that an integer number of fields of the television signals are recorded on each of the successive concentric circular tracks by the head 6. In the embodiment of the invention, as the standard TV signals are, for example, the NTSC system, and therefore the field frequency is 60 Hz, the speed of rotation of the magnetic disc is adjusted to 3,600 r.p.m. so that for every one track, one field of the TV signal is recorded.

In FIG. 2, 4 is a chassis of the body of the apparatus, and 5 is a stepping motor for driving the magnetic head 6. The cassette 2 is indicated by two-dot and dash lines.

Figure 4:
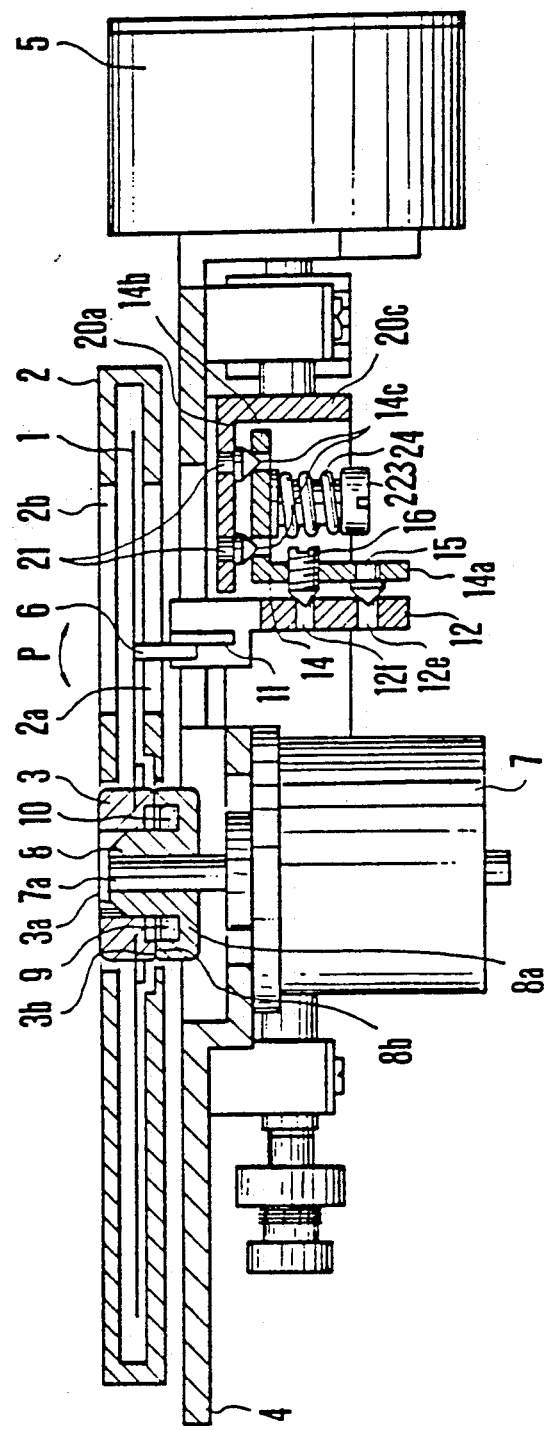
FIG. 4 is a sectional view taken along line IV—IV in FIG. 2.
Figure 5:
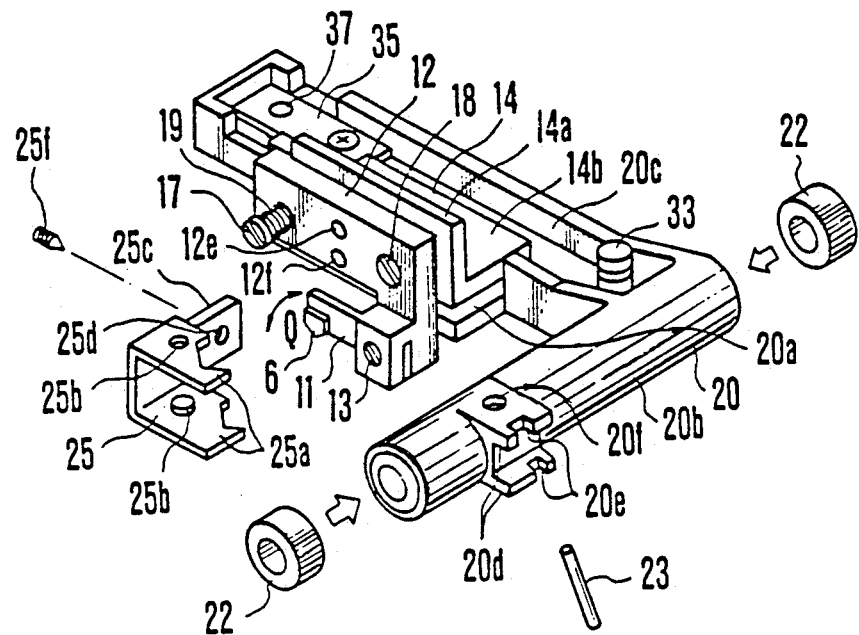
FIG. 5 is an exploded perspective view of the head carriage.

In FIG. 3, there is shown a disc motor 7 and a head carriage 20 supporting an electro-mechanical transducing element 11 to which the magnetic head 6 is fixedly secured as shown in FIG. 5, and formed to a shape almost similar to the letter "L" with a cylindrical portion 20b and an arm 20c. A guide shaft 26 penetrates the cylindrical portion 20b so that the carriage 20 is slidingly movable along an axis of the cylindrical portion 20b. The guide shaft 26 is fixedly secured at its two ends to the chassis 4 by respective leaf spring pressors 27 against shaft bearing blocks 28. A clamper 25, of which details are shown in FIG. 5, is used for fixedly securing to the head carriage 20, a drive pin 23 or a member 23' engaging with a screw (or worm gear) 29a fixedly mounted on a drive shaft 29 of the stepping motor 5. Therefore, rotative movement of the screw 29a is converted through the drive pin 23 to axial movement of the head carriage 20 along the guide shaft 26. A tension coil spring 34 heretofore called a "setting-aside spring" connected at one end thereof to a pin 33 on the head carriage 20 and at the opposite end thereto to a hook 4a (see FIG. 6) on the chassis 4 is helically trained around the cylindrical portion 20b of the head carriage 20 so that the carriage 20 is urged in a direction indicated by an arrow X. At the end of the arm 20c of the head carriage 20 there is shown a leaf spring 35 of rectangular shape in fixedly secured relation by a screw fastener 36. This leaf spring 35 abuts on a guide shaft 38 of which two ends are fixedly secured to the chassis 4 by respective leaf spring pressors 27' against stationary blocks 28' formed as a unit with the chassis 4 by, for example, molding techniques When an adjusting screw 39 is turned (see FIG. 6), the angular position of the head carriage 20 about the guide shaft 26 is changed through the leaf spring 35 in a clockwise or counterclockwise direction with the result that the magnetic head 6 of FIGS. 4 to 6 on the arm 20c is either projected toward or retracted from the magnetic disc 1. The output shaft of the motor 5 is connected to the drive shaft 29 through a flexible connector 32. The drive shaft 29 is rotatably supported on two bearings 30 which are fixedly secured to the chassis 4 by fastener leaf springs 31.

58 is a capstan fixedly secured to one end of the drive shaft 29 by a fastener screw 59. A wire belt 60 is fixed at one end thereof to the capstan 58 and at the opposite end thereof to a groove 43a of a counter drive pulley 43 and is turned around the capstan 58 and the pulley 43 by respective necessary lengths. In another groove 43b of the drive pulley 43, there is provided a spring connector pin 61. A return coil spring 62 for the drive pulley 43 is trained between the pin 61 and another spring connector pin 63 provided on the chassis 4. This return coil spring 62 urges the drive pulley 43 in the direction opposite to that in which the pulley 34 is driven to rotate by the wire.

Stepwise rotation of the stepping motor 5 is transmitted through the flexible shaft connector 32 and the drive shaft 29 to the capstan 58, whereby the wire 60 is wound, causing rotation of the pulley 43. Thus, the counter 40 of the cassette 2 is driven to turn stepwise. Also, rotation of the drive shaft 29 is transmitted through the drive pin 23 to advance the head carriage 20 stepwise axially, whereby the magnetic head 6 carried on the arm 20c of the carriage 20 is shifted in the radial direction of the magnetic disc 1.

Figure 7:
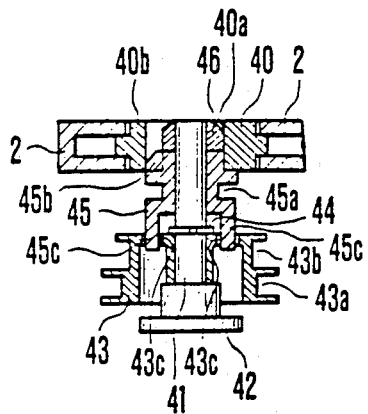

A solenoid 51 with an iron core rod 52 is fixedly mounted on the chassis 4. An extension 53 of the rod 52 is connected through a pivot pin 54 to a bell crank 55 of which the center of rotation is at a pin 56. The bell crank 55 has a protuberance 55a in abutting contact on an arm 47a of a clutch lever 47, the opposite arm of which fixedly carries a pin 49. This pin 49 extends into a circumferential groove 45a of the counter spindle 45 as shown in FIGS. 7 and 8. When the solenoid 51 is energized to attract the iron core rod 52, together with the extension 53 in a direction indicated by arrow Y, the bell crank 55 turns about the pin 56 in a clockwise direction, whereby the arm 47a of the clutch lever 47 is pushed down. This causes the pin 49 to move upward as viewed in FIG. 3 away from the chassis 4 while moving the counter spindle 45 upward. Thereby, the counter spindle 45 is disengaged from the counter 40, and is decoupled from driving the counter 40. Such clockwise movement of the bell crank 55 also causes a movable contact 50a of a normally open switch 50 to contact with a fixed contact 50b thereof through the arm 47a of the clutch lever 47.

Though the illustrated embodiment of FIG. 3 has been described in connection with the stepping motor 5 as arranged in coaxial alignment with the drive shaft 29, it is also possible to otherwise arrange the stepping motor 5 in crossing relation to the drive shaft 29 as shown in FIG. 3A. That is, in FIG. 3A, a support member for the stepping motor 5 is formed in a wall portion 4a of the chassis 4. A worm gear 302 on the output shaft 301 of the stepping motor 5 meshes with a worm wheel 303 which is fixedly mounted on the opposite end of the drive shaft 29 to that of the capstan 58. 31 is a similar fastener leaf spring to that shown in FIG. 3 by which a bearing [30 in FIG. 3) for the drive shaft 29 is fixedly secured to the chassis 4. Since the drive shaft 29 is given a driving torque in a direction indicated by the arrow by the return coil spring 62 for the drive pulley 43 of FIG. 3 through the wire 60 and the capstan 58, the use of such arrangement of the stepping motor 5 provides assurance that no backlash occurs between the worm gear 302 and the worm wheel 303. Therefore, it is made possible to control the movement of the magnetic head 6 with a higher accuracy.

As shown in FIG. 4, the magnetic disc 1 is loaded in such a way that the center core 3 provided at the center of the magnetic disc 1 as a unit therewith is fitted with its hole 3a on the disc spindle 8 fixed to the output shaft 7a of the disc motor 7. On the bottom surface of the center core 3 is mounted a ring-shaped plate 9 made of soft magnetizable material such as iron. By an attractive force of a ring-shaped magnet 10 fixedly mounted on the flanged portion 8a of the disc spindle 8 to this ring-shaped plate 9, a height reference surface 3b of the center core 3 is brought into intimate contact with a reference surface 8b of the flanged portion 8a of the disc spindle 8. Thus, the magnetic disc 1 is set at a prescribed height. After that, when the disc motor 7 is energized, the center core 3 and the disc spindle 8 are rotated without undergoing slippage.

A pair of rectangular plates of piezoelectric material (ceramic) form the electro-mechanical transducing element 11 (hereinafter simply called "bimorph"—see FIG. 5) of which the free end fixedly carries the magnetic head 6 and the opposite end is fixed to a support member 12. This bimorph support member 12 is provided with two position determining holes 12e and 12f. A mount member 14 of approximately "L" shape for the bimorph support member 12 is provided with a properly located conical pin 15 and an adjusting conical screw 16. The conical pin 15 is fixed to a wall 14a of the mount member 14, while the conical screw 16 is movable through the wall 14a of the mount member 14 in threaded engagement therewith so that the length of projection of the screw 16 is variable. With the bimorph support member 12 resting at its holes 12e and 12f on the cones of the pin 15 and screw 16, respectively, when the adjusting screw 16 is turned, as the support member 12 turns about the conical pin 15, pivot point adjustment of the radial position of the magnetic head 6 with respect to the magnetic disc is effected, that is, shift adjustment of the magnetic head 6 in a direction perpendicular to the recording tracks, or indicated by arrow P.

In the angular wall 14b of the mount member 14 other than the wall 14a having the conical pin 15 and the conical screw 16, there are provided two location holes 14c in which engage the conical slant surfaces of conical pins 21 on an intermediate mount portion 20a of the head carriage 20. The mount member 14 is retained to seat on the intermediate mount portion 20a at the conical pins 21 in position adjustable relation to the head carriage 20 by an adjusting screw 222 and a fastener screw 223 with a spring 24.

Figure 5A:
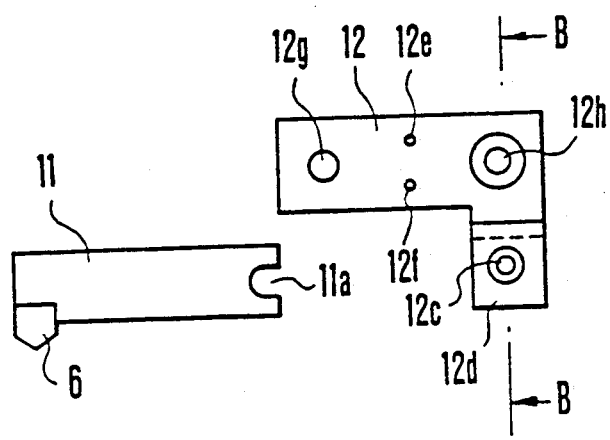
FIG. 5A is an elevational view of a bimorph element supporting a magnetic head and a support member therefor.
Figure 5B:
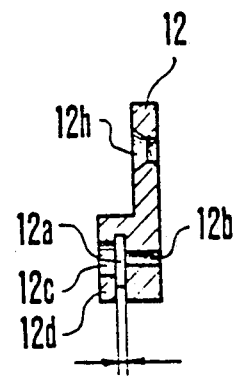
FIG. 5B is a sectional view taken along line B—B in FIG. 5A.

As shown in FIGS. 5 and 5A, the magnetic transducing head 6 is fixedly secured to the free end of the bimorph 11. This bimorph 11 is used as a means for compensating for the shift of the head 6 across the tracks (that is, "tracking adjustment") when the recorded information on the magnetic disc 1 is reproduced, by deformation thereof due to the piezoelectric effect. As shown in FIG. 5A, the end portion of the bimorph 11 is opposite to that having the magnetic head 6 is provided with a "U" shaped cutout 11a. As shown in FIG. 5B, the bimorph support member 12 is provided with a slit 12a of a width slightly wider than the thickness of the bimorph 11. A screw threaded hole 12b is formed in one of the side walls of this slit 12a, the opposite of which is provided with a slightly over-bored hole 12c in coaxial alignment with hole 12b. The tail of the bimorph 11 is inserted into the slit 12a of the support member 12 until the center of the "U" shaped cutout 11a comes to coincide with the axis passing through the centers of the holes 12b and 12c. As shown in FIG. 5, a screw fastener 13 in threaded engagement with the hole 12b past the hold 12c is tightened with deformation of the side wall 12d of the support member 12 toward the opposite side wall having the hole 12b so that the bimorph 11 is clamped at its tail to the support member 12.

The mount member 14, to which the bimorph support member 12 is fixedly secured, is formed approximately "L" shaped and has the conical pivot pin 15 and the adjusting conical screw 16. The bimorph support member 12 is put with its hole 12e and 12f on the conical pivot pin 15 and the adjusting conical screw 16, respectively. When the screw 16 is turned, the angle of the magnetic head 6 with the radius of the magnetic disc 1 is adjusted to a desired setting.

The bimorph support member 12 is fixedly secured to the angular side wall 14a of the mount member 14 by fastener screws 17 and 18 through respective holes 12g and 12h shown in FIG. 5A. A coil spring 19 around the fastener screw 17 urges the support member 12 toward the mount member 14. The other fastener screw 18 also serves as an aximuth adjusting screw. When the screw 18 is turned, as has been described in connection with FIG. 4, because of the location, the conical pin 15 and the adjusting conical screw 16 engage with their tip conical slant surfaces in the holes 12e and 12f of the bimorph support member 12, the support member 12 is caused to turn about a line across the two cones in either direction indicated by arrow Q of FIG. 5, thereby azimuth adjustment of the head 6 is enabled.

Figure 6:
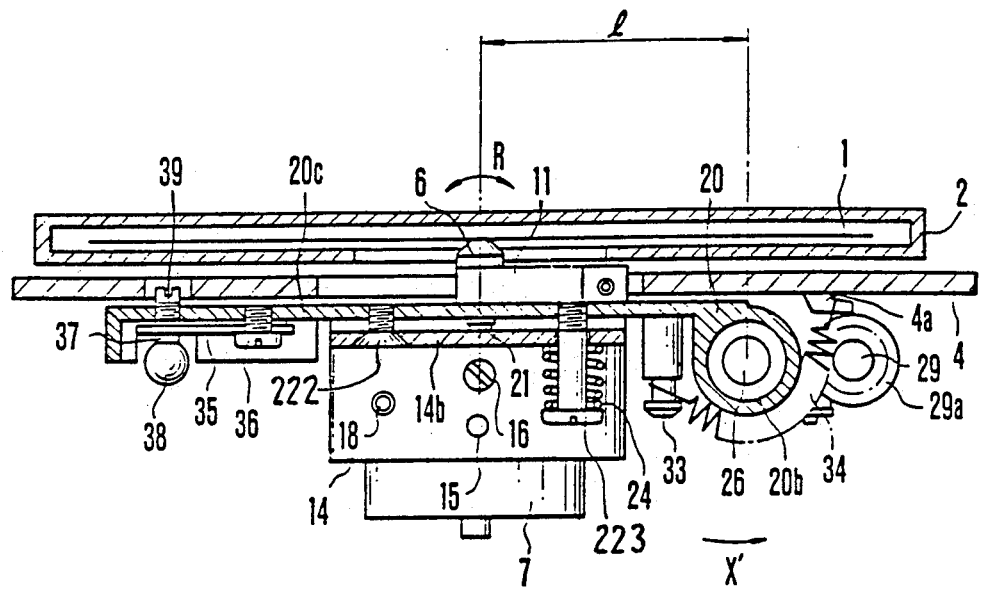
FIG. 6 is a sectional view taken along line VI—VI in FIG. 2.

The mount member 14 is placed with two holes 14c of its base wall 14b on the respective conical pins 21 extending upward from the mount portion 20a as shown in FIGS. 3 and 4. As shown in FIG. 6, the mount member 14 is fixedly secured to the mount portion 20a of the head carriage 20 by the adjusting screw 222 and the retainer screw 223 with the spring 24. When the adjusting screw 222 is turned, the mount member 14 is caused to turn about a line across the conical pins 21 under the bias force of the spring 24 in either direction indicated by arrow R in FIG. 6, whereby adjustment of the angle of the magnetic head 6 with the tangent to the circular track is possible.

The above-described process for adjusting the magnetic head 6 may be summarized as including the following operations:

(1) finely adjusting the screw 222, whereby the mount member 14 turns about the line across the pair of conical pins 21 to effect adjusting of the tilt of the magnetic head 6 in a direction (R in FIG. 6) tangent to the circular recording track of the magnetic disc 1 (FIG. 6);

(2) finely adjusting the screw 16 on the mount member 14, whereby the bimorph support member 12 turns laterally about the conical pin 15 as a pivot point on the mount member 14 to effect adjusting of the shift of the magnetic head 6 in a direction (P in FIG. 4) normal to the recording track of the magnetic disc 1 (FIGS. 4 and 6); and (3) finely adjusting the screw 18 on the bimorph support member 12, whereby the bimorph support member 12 turns about a line across the conical pin 15 and the adjusting screw 16 in a direction (Q in FIG. 5) to effect adjusting of the azimuth angle of the magnetic head 6 (FIG. 5).

To achieve good adjustment of each of the above-described various aspects of the attitude of the magnetic head 6, it is most preferred that, as will be seen from FIG. 6, the conical pin 15 and adjusting screw 16 lie on a vertical line passing through the magnetic head 6 as viewed in FIG. 6, that the fastener screw 17 and the adjusting screw 18 lie on a horizontal line crossing that vertical line at the point of the conical pin 15 as viewed in FIG. 6, and that the two conical pins 21 lie on a line not only perpendicular to the vertical line but also normal to that surface of the mount member 14 which has the conical pin 15 and the adjusting screw 16. But, the present invention is not limited to this.

Next, the construction of the head carriage 20 is described. As shown in FIG. 5, the head carriage 20 comprises a cylindrical portion 20b and an armed portion 20c of almost rectangular shape radially extending from the cylindrical portion 20b. Both of the ends of the cylindrical portion 20b rigidly hold sintered bearings 22 in axial alignment to each other. A jaw portion 20d of a clamper is provided in the form of a pair of portions laterally projected from the side of the cylindrical portion 20b. The projected portions 20d are provided with recesses 20e slightly wider in axial length than the diameter of the drive connection pin 23 which engages with the screw 29a of the drive shaft 29 as has been described in connection with FIG. 3. A line passing the two recesses 20e has a predetermined angle relative to the axis of the cylindrical portion 20b and corresponding to the lead angle of the screw 29a.

A clamper is formed in a "U" shape with two angular side walls, each having a hooked portion 25a and an inwardly embossed portion 25b, each in confronting relation to the other. A base wall 25c contiguous between the side walls has a tapped hole 25d at the center of the area of an armed portion thereof. A pair of pivot holes 20f for the clamper 25 are provided in the side walls of the projected portions 20d of the carriage 20 in vertical alignment to each other as viewed in FIG. 5.

The distance between the inside surfaces of the side walls of the clamper 25 is slightly shorter than the outer diameter of the cylindrical portion 20b of the head carriage 20. To assemble the clamper 25 onto the jaw portion 20d, the angular side walls of the clamper 25 are first slightly widened against its inherent resilient force, then put on the jaw portion 20d, and then pushed until the embossed portions 25b fit in the pivot holes 20f. At this time, the clamper 25 regains its original form by its inherent elasticity without strain. Thus, the clamper 25 is installed to be pivotally movable about a line across the fitted holes 20f relative to the jaw portion on the head carriage 20.

Then, the drive connection pin 23 is inserted into the recesses 20e. After the position of the pin 23 is adjusted, a clamping screw 25f in the tap hole 25d of the armed portion 25c is tightened against the side wall of the cylindrical portion 20b, whereby the clamper 25 reacts to turn about the pivot portions 25b in a counterclockwise direction, while pressing the drive connection pin 23 against the corners of the recesses 20e of the jaw portion 20d at the slant surfaces of the hooked portion 25a as clearly shown in FIG. 3. Thus, the drive connection pin 23 is fixedly secured to the cylindrical portion 20b of the head carriage 20.

The clamper 25 of such construction has several advantages. Since the reaction of the hooked portions 25a to the pressure on the pin 23 operates in the direction of the side walls of the clamper 25, because the side walls have a high rigidity in the parallel direction, they suffer little deformation. Also, since the bracing force for the pin 23 relies on the elastic deformation of the armed portion 25c in the direction of the thickness thereof, it is possible to insure that the drive connection pin 23 is rigidly held with reliability. In addition to this advantage, there is another advantage that it is easy to control adjustment of the bracing force to a desired magnitude with high accuracy. Still another advantage is that the point at which the drive connection pin 23 comes to engage with the screw 29a can be put at a slightly longer distance than the thickness of the angular side wall of the clamper 25 from the head carriage 20 in a direction of the thickness of the body of the apparatus, so that the use of the clamper 25 results in no more than the thickness of one angular side wall of the clamper 25 by which the distance between the guide shaft 26 for the carriage 20 and the drive screw 29a is increased from that value which would be otherwise taken when the drive connection pin 23 is directly connected to the carriage 20.

As shown in FIG. 6, a tension coil spring 34 as the setting-aside means is connected at one end thereof to a hook or pin 33 provided on the head carriage 20 and at the opposite end thereof to another hook 4a on the chassis 4. The spring 34 helically embraces the outer surface of the cylindrical portion 20b of the head carriage 20, thus urging the latter in a direction indicated by arrow X in FIG. 3. Therefore, the head carriage 20 is urged not only to move to the left along the guide shaft 26 as viewed in FIG. 3, but also, to turn about the guide shaft 26 in a counterclockwise direction indicated by arrow X' in FIG. 6 or as viewed from the right side of FIG. 3. Moreover, the spring 34 acts with its belly on the cylindrical portion 20b of the head carriage in a radial direction of the guide shaft 26, thereby giving an advantage that the head carriage 20 is prevented from centrifugal whirling and the radial gap between the guide shaft 26 and the central bore of the cylindrical portion 20b on the order of a few microns is also absorbed.

On the armed portion 20c of the head carriage 20 is fixedly mounted a leaf spring 35 of rectangular shape by a fastener screw 36. The leaf spring 35 has a sliding member 37 made of material of high resistance to abrasion provided thereon. This sliding member 37 is brought into abutting engagement on the guide shaft 38 fixedly mounted on the chassis 4 because the head carriage 20 is given a rotational moment of X' direction about the guide shaft 26. The bias force in the axial direction along the guide shaft 26 to the head carriage 20 serves for removing the backlash in the meshing engagement of the drive connection pin 23 with the screw shaft 29.

The guide shaft 26 unequivocally defines the direction of sliding movement of the head carriage, and the guide shaft 38 restricts the angular position of the head carriage 20 about the guide shaft 26.

In order to control adjustment of the angular position of the head carriage 20, an adjusting screw 39 engages in a screw threaded hole provided through the bottom wall of the armed portion 20c of the head carriage 20 just above the sliding member 37. When the adjusting screw 39 is turned forward against the resilient force of the leaf spring 35, the leaf spring 35 is deformed downward as viewed in FIG. 6 relative to the head carriage 20. At this time, the head carriage 20 reacts to turn about the first guide shaft 26 in a clockwise direction, whereby the magnetic head 6 is moved toward the magnetic disc 1, and is projected further. When the adjusting screw 39 is turned backward, the head carriage 20 turns in a counterclockwise direction, whereby the magnetic head 6 is moved downward away from the magnetic disc 1, and retracted therefrom. Thus, the relative vertical position of the magnetic head 6 to the magnetic disc 1 can be adjusted to a desired setting. It is to be noted in this connection that though the guide shaft 26 also is given a rotative torque, its angular deviation amounts to an actually negligible angle of a few minutes as the range of projected adjustable distances of the magnetic head 6 is at most about 20 microns, and the magnetic head 6 is spaced from the center of the cross section of the guide shaft 26 by a distance l of about 20 mm.

In FIG. 7, a shaft 41 is fixedly mounted on a stand 42 which is fixedly mounted to the chassis 4. The drive pulley 43 is rotatably mounted on the shaft 41 and is restrained from movement in the thrust direction of the shaft 41 by a collar 44. The spindle 45 for the counter 40 is rotatably mounted on the shaft 41 of the pulley 43 and is driven to rotate by the drive pulley 43 when in the illustrated position of FIG. 7. Legs 45c downwardly extending from the spindle 45 movably fit in respective holes provided through the upper wall of the pulley 43. The spindle 45 is provided with a circumferential groove 45a and the key 45b described in connection with FIG. 1A. The key 45b removably fits in the detent slot 40b of the counter 40. A cap 46 as a stopper for limiting the axial movement of the spindle 45 is fixedly attached to the top of the shaft 41.

In FIG. 8, the clutch lever 47 described in connection with FIG. 3 is pivotally mounted on a pin 48. A hairpin spring 57 tensioned between the lever 47 and a pin 57' urges the clutch lever 47 to turn in a counterclockwise direction as indicated by arrow Z. The pin 49 on the free end of the clutch lever 47 extends into the groove 45a of the spindle 45. The arm 47a of the clutch lever 47 abuts at its end on the protuberance 55a of the bell crank 55 as shown in FIG. 3. When the solenoid 51 is energized, the iron core rod 52 moves in the direction of arrow Y, whereby the bell crank 55 is turned in the clockwise direction. Such movement of the bell crank 55 causes its protuberance 55a to push the arm 47a of the clutch lever 47 which, in turn, causes clockwise movement of the clutch lever 47 as viewed in FIG. 8 against the spring 57. Therefore, the spindle 45 is moved downward away from the counter 40. In this state, because the key 45b is taken out of engagement with the key groove 40b, rotation of the spindle 45 is no longer transmitted to the counter 40. Therefore, the counter 40 is allowed to hold its indication of the number of those of the tracks of the magnetic disc 1 which have so far been traversed during recording or of the location of the last recorded track (or the next recording track). And, at this time, the movable contact 50a of the switch 50 is brought into contact with the fixed contact 50b by the arm 47a of the clutch lever 47 to form an electrical conductive path, whereby the apparatus is switched to a record prohibiting mode.

With the solenoid 51 in the unenergized state, the spring 57 urges the clutch lever 47. Until the phase of the key 45b of the spindle 45 coincides with that of the counter 40, however, the spindle 45 is held in the retracted position. As the spindle 45 is turning, when the phase of the key 45b of the spindle 45 comes to coincide with that of the key groove 40b of the counter 40, the spindle 45 is moved upward and its key 45b engages in the key groove 40b. At this time, the contacts 50a and 50b of the switch 50 are taken out of contact with each other, whereby electrical conduction is cut off.

Therefore, on the assumption that a cassette 2 containing a magnetic disc 1 which is partially recorded is loaded on the apparatus for further recording, since the counter 40 of that cassette 2 contains information concerning the next recording position, or the next track number, the position of this last recorded track can be detected when the key 45b is registered in the key groove 40b and the switch 50 is opened. Therefore, the recording operation for the second time can start from a position just next to the last recorded track. For this reason, improper operation which might superimpose new information on the recorded tracks can be avoided.

During reproduction, it is normal for the magnetic head 6 to access at random all the recording tracks. In such a case, if the counter spindle 45 were otherwise arranged so that when the phases of the key 45b and the key groove 40b coincide with each other, the key 45b is put into engagement with the groove 40b, as the reproducing goes on, the counter 40 would advance from the position indicative of the next recording track. Thus, the storage of the indication of where the preceding recording operation was terminated is broken.

For this reason, during reproduction, the solenoid 51 is energized so that the key 45b of the spindle 45 is maintained in the retracted state from the groove 40b of the counter 40 and the rotation of the counter spindle 45 is not transmitted to the counter 40. Therefore, during the reproducing operation, the information indicative of where the next recording track lies can be appropriately retained on the counter 40.

The procedure to adjust the increment of progression of the counter 40 in accordance with the width between the successive two tracks of the magnetic disc 1 and to establish the coincidence between the indicated number in the scale for the counter 40 and the number for the track at which the magnetic head 6 faces will be described hereinafter with reference to FIGS. 3 and 8.

In FIG. 3, by a setting screw 59, the capstan 58 is fixedly secured to one end of the drive shaft 29 so that the capstan 58 rotates as a unit with the drive shaft 29. The length of the wire 60 connected between the capstan 58 and the drive pulley 43 is longer than the distance therebetween by at least the circumference of the drive pulley 43. The return coil spring 62 is tensioned between the hook 61 in the groove 43b of the drive pulley and the hook 63 on the chassis 4 and embraces the drive pulley 43 at the groove 43b so that the drive pulley 43 is urged in a clockwise direction to take up the excess of the wire 60 on the groove 43a thereof.

Here, the diameters of the capstan 58 and the drive pulley 43 are previously adjusted to respective proper values so that for every predetermined index angle of a counter click mechanism (not shown) for the counter 40, i.e., every angular step of motion of the stepping motor 5, or every track pitch by which the magnetic head 6 advances, the counter 40 advances one increment.

Then, the coincidence between the corresponding position of the magnetic head 6 to the first recording track on the magnetic disc 1 and the indicating position of the counter 40 for the first recording track is established in the following way. The stepping motor 5 is first operated until the magnetic head 6 comes to align with the first recording track. Then, under this condition, the setting screw 59 is loosened, and the angular position of the capstan 58 relative to the drive shaft 29 is changed to bring the key 45b of the counter spindle 45 together with the key groove 40b of the counter 40 into accurate registry with the first graduation of the track number scale. After that, the setting screw 59 is tightened. Thus, the phase of the counter 40 is adjusted.

Referring next to FIGS. 9 and 10, there is shown an electrical circuit system usable in this embodiment of the apparatus.

In FIG. 9, a recording switch 101 and a reproduction switch 102 give signals to a mode selection circuit 103. For the recording mode, only the output RC, and for the reproduction mode, only the output RP are at a high level. These outputs RC and RP are respectively applied to a recording operation control AND gate 104 and a reproduction operation control AND gate 109 together with one of the outputs of a comparator circuit 114 which represents "A=B" to be described later. Further, a third input of the AND gate 104 is connected to the output of the switch 50 of FIG. 3 which is at a high level when it is open. The outputs of these AND gates 104 and 109 control, respectively, a recording signal processing circuit 130 and a reproduction signal processing circuit 131. 110 is a resistor.

105 is a track command switch for commanding a desired track address or number constructed, for example, with ten keys. Data n, concerning the indicated track address by the command switch 105, are stored on a register 106. An indication device 107 indicates not only the indicated track address on the register 106, but also the selected mode (recording or reproduction mode) and a record inhibit state in the recording mode. For this purpose, the indication device 107 is supplied, in addition to the output of register 106, with the outputs RC and RP of mode selection circuit 103 and the output of AND gate 104 after the latter has been inverted by an inverter 122. As the indication device 107, use may be made of a small sized indicator of liquid crystal, electrochromic or light emitting diode array. A data conversion table 108 comprising, for example, ROM or the like produces an output representative of, in this instance, 4n as the head position setting data. Here 4n means that for the data n, representing the track address indicated by the command switch 105 (for example, in a binary coded digital form), the stepping motor 5 (FIG. 3), advances the magnetic head 6 through the length of 4n steps which is equal to the total of n track pitches.

An UP-DOWN counter 113 (hereinafter abbreviated as "U/D" counter) detects the position of the magnetic head 6 moved by the stepping motor 5. A comparator circuit 114 compares the output of the data conversion table 108 (called "A") with the output of U/D counter 113 (called "B") to produce three signals depending on differences between the values of the outputs A and B, or representing "A>B", "A=B", and "A<B". A pulse generator 115 produces a train of pulses for driving the stepping motor 5. Hereinafter, explanation proceeds on the assumption that for every one pulse, the stepping motor 5 advances one step. The operation of the motor 5 is controlled by a control circuit 116 in accordance with the outputs of comparator circuit 114 and the output of pulse generator 115. Responsive to the high level of the output "A>B" of the comparator circuit 114, the control circuit turns the motor 5 in a forward direction, and responsive to the high level of the output "A<B", it reverses rotation of the motor 5. When the output "A=B" changes to a high level, the motor 5 is stopped. The control circuit 116 produces a direction command signal representing either of the forward and reversed rotations of the motor 5, and pulses for driving rotation of the motor 5, wherein the direction command signal is at a high level for the forward rotation and at a low level for the reversed rotation. In response to the outputs of control circuit 116, a drive circuit 117 rotates the motor 5 in the indicated direction by the indicated amount. An OR gate 118 has two inputs which are connected to the output "A<B" of comparator circuit 114 and an output of a resetting circuit 127 and has an output which is connected to the "reversed rotation" input of control circuit 116.

Here, the magnetic head 6 is assumed to move in a direction to increase the track address number (or from the outer periphery to the center core 3 of the magnetic disc (1) when the motor 5 rotates in the forward direction, and to move backward to decrease the track address number when the motor 5 rotates in the reversed direction. The rotation direction indicating signal and the pulses from control circuit 116 are applied, respectively, as the count mode setting signal and the count pulses to U/D counter 113. In this case, U/D counter 113 is set to the up count mode by the high level of the rotation direction indicating signal, that is, the indication of the forward rotation, and to the down count mode by its low level, that is, the indication of the reverse rotation.

A building-up synchronous type RS flip-flop 119 is set when the output "A<B" of the comparator circuit 114 is at a high level, and reset when the output "A>B" is at a high level. An OR gate 120 is receptive of the Q output of this flip-flop 119, the output RC of mode selection circuit 103 and the output of resetting circuit 127. A solenoid drive circuit 121 responsive to the output of OR gate 120 energizes the solenoid 51 of FIGS. 3 and 8. An AND gate 112 receptive of the output of a record start (trigger) switch 111 and the output of AND gate 104 produces an output which is applied as a control signal to the recording signal processing circuit 130.

An electrical power source circuit 124 is connected through a switch 125 to the pulse generator 115, control circuit 116, drive circuit 117, OR gates 118 and 120, flip-flop 119, solenoid drive circuit 121, stepping motor 5, a reference position detector 126 for the magnetic head 6, and a resetting circuit 127. It should be noted that the disc motor 7 (FIGS. 3, 4 and 6) may be connected through the switch 125 to a battery circuit 124. As the magnetic head 6 is moving to a predetermined reference or reset position radially outwardly beyond the first track of the magnetic disc 1, when it reaches the reference position, the detector 126 produces an output signal which is applied to the resetting circuit 127. The resetting circuit 127 continues to produce a resetting signal for moving the magnetic head 6 to the reference position until the magnetic head 6 reaches the reference position. The resetting signal is applied through OR gate 118 to the control circuit 116. Responsive to this resetting signal, the control circuit 116 produces the rotation direction control signal for rotating the motor 5 in the reverse direction and the driving pulses therefor until the resetting signal disappears.

Here, by reference to FIG. 10, the details of the reference position detector 126 and the resetting circuit 127 are described. The detector 126 includes a light emitting element, for example, a light emitting diode 126a, and a photosensitive element, for example, a phototransistor 126b. The anode of diode 126a and the collector of phototransistor 126b are connected through a common resistor 126c to the power switch 125. A shutter plate 126e is movable along with the head carriage 20 (FIG. 3) and is arranged between the elements 126a and 126b to intercept rays of light from the diode 126a to the phototransistor 126b when head 6 arrives at the reference position. A junction S of the emitter of phototransistor 126b is connected to a SET input of a falling edge synchronous RS flip-flop 127a in resetting circuit 127. A power-up clear circuit 127b responsive to closure of the battery switch 125 and receptive of current from the battery circuit 124 produces a pulse of high level which is given to a RESET input of the RS flip-flop 127a. The Q output of RS flip-flop 127a is connected to the inputs of OR gates 118 and 120 and inverter 123 of FIG. 9. The RS flip-flop 127a also is connected to power source circuit 124 when switch 125 is closed.

In operating detector 126 and resetting circuit 127, when the power switch 125 is thrown, power-up-clear circuit 127c produces a pulse, whereby the RS flip-flop 127a is reset. As the Q output of the RS flip-flop 127a changes to a high level, therefore, the input of control circuit 116 which is connected through OR gate 118 to the output "A<B" is changed to a high level and, as the motor 5 rotates in the reverse direction, the magnetic head 6 starts to move toward the reference position. When the magnetic head 6 reaches the reference position, the shutter plate 126e enters the optical path between the light emitting element 126a and the photosensitive element 126b, changing the potential at the junction S to low level, whereby the RS flip-flop 127a is set and its Q output is changed to a low level. Therefore, "A<B" input of control circuit 116 is changed to a low level, whereby the motor 5 is de-energized. After that, when the magnetic head 6 moves from the reference position to an indicated position, the shutter plate 126e leave optical path. Though this causes the potential at the junction S to change to a high level, because the RS flip-flop 127a is of the falling edge synchronous type, it is left unchanged from the set state.

Returning to FIG. 9, when the magnetic head 6 is reset in the reference position, the resetting signal of the circuit 127 is released, changing the output of the inverter 123 to a high level, whereby a switching circuit 128 is closed to connect to the power source circuit 124 all the circuit portions except those which have been connected to the power source circuit 124 when switch 125 was thrown. Then, a power-up-clear circuit 129 operates, giving a power-up-clear pulse (PUC) to the mode selection circuit 104, register 106 and U/D counter 113, whereby these circuits are cleared or reset.

130 is a recording signal processing circuit receptive of video signals at an input terminal 130a for producing signals recordable on the magnetic disc 1 by the magnetic head 6, and 131 is a reproduction signal processing circuit for reproducing the recorded signals from the magnetic disc 1 as the magnetic head 6 picks them up. The operations of these circuits are controlled by the respective AND gates 121 and 122 as has been described before. The reproduced signals are visually displayed by a display device 132, but the output of the reproduced signals may be connected to a printer or other output device.

In the operation of the circuit of FIG. 9, when the power switch 125 is thrown, the pulse generator 116, control circuit 116, drive circuit 117, OR gates 118 and 120, flip-flop 119, solenoid drive circuit 121, reference position detector 126, resetting circuit 127, stepping motor 5, and, if necessary, disc motor 7 are supplied with electrical power from the power source circuit 124, and the resetting circuit 127, in turn, supplies the reset signal to the control circuit 116 through the OR gate 118 until the magnetic head 6 reaches the reference position. During this resetting operation, the control circuit 116 maintains its rotation direction control signal at a low level, commanding the drive circuit 117 to rotate the motor 5 in the reverse direction and also the pulse generator 115 to produce pulses. As a result, the drive circuit 117 energizes the motor 5 to rotate in the reverse direction, bringing the magnetic head 6, which was not in the reference position, to the reference position. Meanwhile, because the resetting signal from the circuit 127 changes the output of the OR gate 120 to a high level, the solenoid drive circuit 121 operates to energize the solenoid 51, whereby the counter spindle 45 is taken out of engagement with the counter 40 on the cassette 2. In this state, the spindle 45 is rotating in vain until the magnetic head 6 reaches the reference position. When the head 6 has reached the reference position, the detector 126 changes its output to a low level, causing the resetting circuit 127 to terminate the supply of the resetting signal to the control circuit 116 whereby the motor 5 is stopped. Such termination of production of the resetting signal also causes the output of OR gate 120 to change to a low level which, in turn, causes the solenoid drive circuit 121 to de-energize the solenoid 51. Therefore, the counter spindle 45 is released from the retracted position, and is ready to engage with counter 40. Since, at this time, the key 45b of the counter spindle 45 is put out of alignment with the key groove 40b of the counter 40, their connection does not take place yet.

When the resetting signal from the circuit 127 becomes of a low level, the output of the inverter 123 becomes of a high level, actuating the switching circuit 128 to supply electrical power from power source circuit 124 to all the circuit portions other than those which have been connected to power source circuit 124 when power switch 125 was previously closed. Then, the power-up-clear circuit 129 operates, applying its output as the power-up-clear pulse to the mode selection circuit 104, register 106, and U/D counter 113, whereby these circuits are cleared or reset.

Therefore, the indication device 107 indicates a numerical character "zero" in track address number.

Then, when either the recording switch 101 or the reproduction switch 102 is pushed down, and a desired track address is set in by the track command switch 105, data n for that track address is stored in the register 106, and the indicated number of track address and the set mode of the apparatus are indicated by the indication device 107. And, the data conversion table 108 produces an output representative of data 4n which is applied to the input A of the comparator circuit 114, while the input B of the comparator circuit 114 is supplied with the output of U/D counter 113. Since, at this time, the output of the U/D counter 113 is zero, the comparator 114 changes its "A>B" output to a high level. Responsive to this, the control circuit 116 changes its rotation direction control signal to a high level, commanding the motor 5 to rotate in the forward direction, and passing the driving pulses from the pulse generator 115 to the drive circuit 117 therethrough. As a result, the drive circuit 117 rotates the motor 5 in the forward direction and the magnetic head 6 is moved from the reference position to the indicated n-th track. Meanwhile, the command for forward rotation of the motor 5 from the control circuit 116 also sets the U/D counter 113 in the up-count mode. As the magnetic head 6 moves in steps, corresponding pulses are counted up. When the magnetic head 6 arrives at a position in alignment with the track of n-th address, the number of pulses counted by the U/D counter 113 reaches just 4n, and, therefore, of the outputs of the comparator circuit 114, "A=B" takes a high level. Responsive to this, the control circuit 116 no longer passes the motor driving pulses therethrough, whereby the motor 5 is stopped and the magnetic head 6 is set in a position for the track of n-th address.

Here, the operations of the reproduction mode and the recording mode are separately described.

(1) The reproduction mode:

When the reproduction switch 102 is actuated to select the reproduction mode, the output RP of the mode selection circuit 103 is changed to and maintained at a high level. Therefore, the output of the OR gate 120 is maintained at a high level, whereby the solenoid 51 is maintained in the energized state by the drive circuit 121 during the reproducing operation. Therefore, it is during the reproducing operation that the counter spindle 45 is maintained out of engagement with the counter 40 on the cassette 2, and stepwise advancing of the counter 40 never occurs.

As, has been described before, when the head 6 has been set in the indicated track position by the change of the output "A=B" of the comparator circuit 114 to a high level, the output of the AND gate 109 changes to a high level at which the reproduction signal processing circuit 131 starts to operate. The reproduced image can be viewed on the display device 132.

Suppose after the n-th track has been fully reproduced, the operator wishes to move the magnetic head 6 to another track position of n'-th address. Then, the operator needs to indicate a number n' through the switch 105. At this time, which of the outputs "A>B" and "A<B" of the comparator circuit 114 changes to a high level depends on which of the numbers n and n' is larger. Based on its result, the direction of rotation of the motor 5 and the count mode of the U/D counter 113 are determined. In principle, however, the magnetic head 6 moves from the track position of n-th address to the new track position of n'-th address in a similar way to that described in connection with the movement of it from the reference position to the n-th address track position. In this case, also, the movement of the magnetic head 6 is controlled with accuracy of four steps for every one track.

And when the head 6 arrives at the track position of n'-th address, the output "A=B" of the comparator circuit 114 changes to a high level, whereby the head 6 gets stopped in that position. At this point in time, the output of the AND gate 109 takes a high level again. Therefore, similarly to the n-th track position, the reproduced image from the n'-th track is displayed.

(2) The Recording Mode:

When recording switch 101 is actuated to select the recording mode, the output RC of the mode selection circuit 103 is changed to and maintained at a high level.

Now assuming that the desired track address n set by the track command switch 105 is smaller than the last recorded track address N memorized on the counter 40 of the cassette 2, or n<N, then when head 6 is automatically moved to and stopped in the track position of n-th address, the key 45b of the counter spindle 45 is not yet engaged in the key groove 40b of the counter 40. Therefore, the switch 50 is in the ON state, where the output of the AND gate 104 is at a low level, prohibiting recording of signals. And, at this time, the output of the inverter 122 is of a high level, allowing indication device 107 to indicate that recording is inhibited.

Alternatively assuming that n≧N, then in the course of movement of the head 6 to the track position of n-th address, when it comes on a track position of N-th address, the phase of the key 45b of the counter spindle 45 coincides with that of the key groove 40b of the counter 40. Then, the key 45b enters into the key groove 40b, whereby the switch 50 is opened. As the head 6 continues moving, when it arrives at the track position of n-th address, the output "A=B" of the comparator circuit 114 changes to a high level, and, therefore, the output of the AND gate 104 changes to a high level, whereby the output of inverter 122 is changed to a low level at which the display of the "recording inhibition" disappears in the indicating device 107. With the head 6 set in the track position of n-th address, when the record start switch 111 is actuated, the output of the AND gate 112 is changed to a high level. Responsive to this, the recording signal processing circuit 130 starts to operate, allowing video signals (television signals) to be recorded through the magnetic head 6 on the rotating magnetic disc 1 at the indicated or n-th track by one field or one frame for each track. The source for such video signals may be any of a built-in video camera, a separate video camera, and a television antenna.

Next, assuming that after the recording of the n-th track has been completed, another track of address n' is subjected to recording, where n'>n, then the head 6 is moved to a track position of address n', and also the counter 40 is caused to advance until address n', allowing the recording for the n'-th track to proceed. Conversely, when n'<n, the output "A<B" of high level from the comparator circuit 114 sets the flip-flop 119, whereby its Q output is changed to a high level, the output of the OR gate 120 is changed to a high level. Thereupon, the solenoid drive circuit 121 energizes the solenoid 51, causing the counter spindle 45 to be retracted from the counter 40, and also causing the switch 50 to turn on. Thus the AND gate 104 prohibits recording for the n'-th track from going on. It also results that during the time when the magnetic head 6 is moving to the track position of address n', the counter spindle 45 rotates in vain.

As the apparatus is put in the recording inhibition state, when the indicated address is altered from n' to n" where n">n (>n'), the head 6 is moved to a track position of address n", and, because, at this time, the output "A>B" of the comparator circuit 114 becomes of a high level (since N">n), the flip-flop 119 is reset, whereby its Q output is changed to a low level. Thereupon, the output of the OR gate 120 becomes of a low level, causing the solenoid drive circuit 121 to terminate the energization of the solenoid 51. Therefore, similarly to what has been described before, in the course of movement of the head 6 to the track position of address n", when it comes on the track position of address n, the counter spindle 45 engages with the counter 40. As the head 6 continues moving, the counter 40 is caused to advance until n". Then, the switch 50 is opened, allowing a recording operation. On the other hand, when n>n">N', the output "A>B" of the comparator 114 becomes of a high level, then the flip-flop 119 is reset, then the output of the OR gate 120 becomes of a low level, and then the solenoid 51 is deenergized. In this case, however, the key 45b of the counter spindle 45 does not coincide in phase with the key groove 40b of counter 40, leaving the counter spindle 45 in the retracted position from the counter 40 where the switch 50 remains ON. Thus, no recording is allowed to take place. It should be recognized that with the apparatus in the recording mode, only when a larger track number than that of the last recorded track in the preceding recording operation is indicated does a subsequent recording operation become possible to start, thus preventing double recording.

Of course, when recording, looking at the indicated value N of the counter 40 on the cassette 2, the operator may set the track command switch 105 to a track address n at n=N so that the subsequent recording operation starts with a track just next to the last of the tracks which have already been recorded. Also for successive recording operations, the operator will change the set value of track address through the switch 105 to (n+1), (n+2), (n+3) and so on. That is, by one increment of the indicated address from the value of the address of the just-preceding recorded track, each time the next recording operation is to be initiated, video signals can be recorded on the successive prescribed tracks without having to produce loss spaces on magnetic disc 1.

It should be pointed out that when recording, it is required to control the operation of counter 40 in such a way that at the termination of one recording operation for each track, the counter 40 on the cassette 2 is advanced one increment so that the counter 40 always points to the first fresh track address. Otherwise, it would become impossible to achieve assurance that the last recorded track is well protected against double recording. And, in this respect, after the recording operation has been terminated at, for example, n-th address, the switch 105 may be managed to shift the head 6 to the (n+1) address with the result that the counter 40 advances its indication by one increment. Another method is, as will be described in connection with FIG. 11, that when one field or one frame of video signals have all been recorded, the recording signal processing circuit 130 is made to produce a head shift pulse by which the head is automatically advanced by one track pitch with the result that the counter 40 gets one increment.

Finally, with reference to FIG. 11, an example of a variation of the circuit system of FIG. 9 will be described. In the circuit system of FIG. 9, though it has an advantage that any of the fresh recording positions can be chosen as desired, there is a disadvantage that even when in the recording mode, what track is to be recorded must be indicated through the command switch 105, and, as it is not always insured that the indicated track number coincides with the first fresh one, there is a possibility of formation of a large loss space between the last recorded track for the preceding recording operation and the first recording position for the following recording operation. With these points in mind, the circuit system of FIG. 11 is constructed so that any subsequent recording operation starts without the necessity of manually indicating what track is first to be recorded through the switch 105, and so that at the termination of recording of each track, the head 6 is automatically moved to the successively adjacent recording positions. Since the majority of constituent parts of FIG. 11 are the same as those of FIG. 9, there is solely explained the variations from FIG. 9.

At first, in the circuit system of FIG. 11, the flip-flop 119 seen in the circuit system of FIG. 9 is omitted, and, therefore, the OR gate 120 is connected so as to receive the output RP of the mode selection circuit 103 and the resetting signal from the resetting circuit 127. 133 is an AND gate connected, in view of the recording control AND gate 104, so as to receive the output RC of the mode selection circuit 103 and the signal which takes a high level when switch 50 is open, and the inverter 112 is connected, instead of the output of the AND gate 104, to the output of this AND gate 133. 134 is a pulse generator for producing a train of pulses with a predetermined frequency during the time when the output of the inverter 122 is maintained at a high level Here, the period of the pulses produced from this pulse generator 134 is chosen so as to be longer than the time necessary for the motor 5 and its related circuit portions to move the magnetic head 6 through the length of one track pitch. Also, here the recording signal processing circuit 130 is otherwise constructed to produce a head shift pulse SH when video signals (television signals) for one field or one frame have been recorded on the magnetic disc 1 through the head 6 in response to the high level of the output of the AND gate 112. This head shift pulse SH from the recording signal processing circuit 130 and the aforesaid pulses from the pulse generator 134 are applied through an OR gate 135 to an UP counter 136 at the count input thereof. The counter 136 counts up this input pulse and is cleared by the power-up-clear pulse from the power-up-clear circuit 129. The count output of the counter 136 is applied to a data selector 137 at an input A thereof, another input B of which is connected to the output of the register 106. Applied as a control signal to this data selector 137 is the output RC of the mode selection circuit 103. When the output RC is at a high level, the data selector 137 passes the input data at A input, that is, the count output of the counter 136, to its output. For the time other than that, the input data at B input, that is, the output of the register 106, is passed to its output. The output of the data selector 137 is applied to the indication device 107 and the data conversion table 108.

The parts other than those described just above are similar in construction and arrangement to those shown in FIG. 9.

With the circuit system of such construction, the reproduction mode operates in exactly the same manner as in the circuit system of FIG. 9. Therefore, no further explanation is required. In the following, the operation of the recording mode will be described.

With the magnetic head 6 reset in the reference position by throwing the power switch 125, when recording switch 101 is turned on under the condition that the switch circuit 128 is ON, the output RC of the mode selection circuit 103 changes to a high level. In this state, however, the key 45b of the counter spindle 45 and the key groove 40b of the counter 40 on the cassette 2 are out of coincidence with each other. Therefore, the counter spindle 45 remains in the downwardly moved position, closing the switch 50. Therefore, the output of the AND gate 104 remains at a low level, prohibiting a recording operation.

Meanwhile, since, at this time, the output of the AND gate 133 is also of a low level, and, therefore, since the inverter 122, responsive to the output of a low level from the AND gate 133, produces an output of high level, the recording inhibit state is indicated by the indication device 107 and the pulse generator 134 starts to produce pulses. These pulses are applied through the OR gate 135 to the counter 136, and are counted by the counter 136.

Here, in the recording mode, by the high level of the output RC of the mode selection circuit 103, the data selector 137 selects its A input, or the count output of the counter 136. Therefore, now assuming that the counter 136 counts one pulse from the OR gate 135, and its count value becomes "1", this, while being indicated by the indication device 107, after having been converted to "4" by the data conversion table 108, is applied to the A input of the comparator circuit 114. Meanwhile, in this state, the count value of the U/D counter 113 is "0" (zero). Therefore, the output "A>B" of the comparator circuit 114 becomes of a high level. Responsive to this, the control circuit 116 and the drive circuit 117 rotate the motor 5 in the forward direction by four steps, whereby the head 6 is moved from the reference position toward the center core 3 of the disc 1 by one track pitch and is positioned in alignment with the first track. If the setting of the head 6 in the first track position does not result in the coincidence between the phases of the key 45b of the counter spindle 45 and the key groove 40b of the counter 40, the switch 50 is maintained closed, leaving the recording operation prohibited. And, when the count value of the counter 136 is changed to "2" by the next pulse from the OR gate 135, the head 6 is moved to and set in a second track position in a manner similar to that described above. Such procedure is repeated until the phases of the key 45b of the counter spindle 45 and the key groove 40b of the counter 40 come to coincide with each other. That is, the head 6 is automatically moved to the track position indicated by the key groove 40b of the counter 40 on the cassette 2. As the head 6 arrives at the track position indicated by the key groove 40b of the counter 40, when the phases of the key 45b of the counter spindle 45 and the key groove of the counter 40 coincide with each other, it is at this point in time that the counter spindle 45 drivingly couples with the counter 40. At this time, the switch 50 is opened. When the switch 50 is opened, the output of the AND gate 133 becomes of a high level, so that the output of the inverter 122 becomes of a low level. Therefore, the pulse generator 134 no longer produces pulses, and the indication of the "recording inhibition" at the indication device 107 disappears. And, at this time, the output "A=B" of the comparator circuit 114 becomes of a high level. Therefore, the output of the AND gate 104 also becomes of a high level. Thus, recording becomes possible.

In this state, when the record start switch 111 is operated, as has been described above, the recording signal processing circuit 130 allows the head 6 to record video signals (television signals) for one field or one frame on the disc 1. After this recording is finished, the recording signal processing circuit 130 produces a head shift pulse SH which is applied through the OR gate 135 to the counter 136, whereby the counter 136 counts one count up. Thereby, the output "A>B" of the comparator circuit 114 becomes of a high level so that the head 6 is shifted by one track pitch, and, at this time, the indication of the counter 40 on the cassette 2 also is renewed by one increment. Hence, each time the record start switch 111 is operated, the recording of one field or one frame of video signals followed by the automatic shifting of the head 6 to the next recording position (together with the renewing of the indicated value of the counter 40) is carried out in such a way as described above.

It will be appreciated that according to the features of the circuit system of FIG. 11, when the apparatus is set in the recording mode, the head 6 is automatically set to the recording position indicated by the counter 40 on the cassette 2, and, after the termination of one cycle of recording operation, is automatically shifted to the next recording position. Moreover, in this case, the operation of the track command switch 105 becomes unnecessary. That is, the switch 105 will be used exclusively in the reproduction mode for indicating a track to be reproduced.

It should be noted that, as shown in FIG. 11, the video signals appearing at the video signal input terminal 130a may be supplied to the display device 132, and the output RP of the mode selection circuit 103 is necessarily applied as a control signal to the display device 132 so that when the output RP is of a high level, the output of the reproduction signal processing circuit 131 is selected, and otherwise the video signals from the input terminal 130a are selected. That is, thereby when recording, the image being recorded can be viewed on the display device 132.

While specific embodiments of the invention have been shown and described in detail to illustrate the application of the inventive principles, it will be understood that the invention may be embodied otherwise without departing from such principles.

What I claim:

1. A recording and/or reproducing apparatus using a disc-shaped record bearing medium, comprising:
   (a) recording and/or reproducing head means for recording and/or reproducing signals on the record bearing medium, said head means being positionable in a protruding position in which said head means protrudes toward the record bearing medium, and a retracted position in which said head means is retracted from the record bearing medium;
   (b) head carrying means, mounting said head means thereon, for moving said head means in a radial direction of the record bearing medium for changing a recording track on the record bearing medium;

(c) guide means, including a guide shaft disposed in said radial direction, for linearly guiding the movement of said head carrying means along said radial direction, said head carrying means being rotatable about a rotating axis formed by said guide shaft; and (d) control means for controlling the position of said head means between said protruding position of said head means protruding toward the record bearing medium and said retracted position of said head means retracting from the record bearing medium, by the rotating of said head carrying means around said guide shaft.

2. An apparatus according to claim 1, wherein said control means includes head position adjusting means for adjusting the protruding position of said head means protruding toward the record bearing medium, under the action of rotating said head carrying means about said guide shaft.

3. An apparatus according to claim 2, further comprising a second guide shaft disposed in parallel with said guide shaft, wherein said head carrying means guided in the radial direction by said guide shaft and second guide shaft.

4. An apparatus according to claim 3, further comprising a medium rotating spindle provided to drive the record bearing medium.

5. An apparatus according to claim 4, wherein said second guide shaft is disposed at a side of said spindle opposite to said guide shaft.

6. An apparatus according to claim 3, wherein said head position adjusting means rotates said head carrying means about said guide shaft according to a change in height of said head carrying means relative to said second guide shaft to produce the rotation.

7. An apparatus according to claim 6, wherein said head position adjusting mechanism includes an engaging member disposed on said head carrying means to engage said second guide shaft and an adjusting screw provided so as to adjust a protruding amount of said engaging member relative to said second guide shaft.

8. An apparatus according to claim 1, further comprising a screw shaft disposed in parallel with said guide shaft, and a motor to rotate said screw shaft, said screw shaft having an engaging portion engaging with a drive pin of said head carrying means to move said head carrying means along said guide shaft under the action of rotation of said screw shaft.

9. An apparatus for effecting a recording or reproducing operation by moving a recording or reproducing head relatively to a disc-shaped recording medium in a predetermined direction, comprising:

(a) rotatable head carriage on which said recording or reproducing head is mounted;

(b) first guide means for guiding said head carriage for movement in said predetermined direction, and said head carriage rotated about a rotating axis formed by said first guide means;

(c) rotating means for rotating said recording medium;

(d) energizing means for urging said head carriage in a direction to protrude said head toward said recording medium;

(e) head position control means for controlling an angle of the rotation of said head carriage relative to said first guide means to control a position of said head in a direction of protruding or retracting said head relatively to said recording medium; and (f) second guide means disposed in parallel with said first guide means, said head carrying means being guided in the radial direction by said first guide means and said second guide means.

10. An apparatus according to claim 9, further comprising rotating means for rotating said recording medium, said second guide means being disposed at a side of said rotating means opposite to said first guide means.

11. An apparatus according to claim 10, wherein said head position control means includes adjusting means for rotating said head carriage around a rotating axis formed by said first guide means so as to adjust an amount of said head protruding relative to said recording medium, according to a change in height of said head carriage relative to said guide means to produce the rotation.

12. An apparatus according to claim 11, wherein said adjusting means includes a leaf sprig disposed on said head carriage so as to engage said second guide means and an adjusting screw provided so as to adjust a protruding amount of said leaf spring relative to said second guide means.

13. An apparatus according to claim 11, wherein said energizing means urges said adjusting means in a direction for bringing said adjusting means into pressed contact with said second guide shaft.

14. An apparatus according to claim 9, further comprising a screw shaft disposed in parallel with said guide means, and a motor to rotate said screw shaft, said screw shaft having an engaging portion engaging with a drive pin of said head carrying means so as to move said head carrying means along said guide means under the action of rotation of said screw shaft.

15. An apparatus according to claim 14, wherein said energizing means urges said head carriage also in one direction lengthwise of said guide shaft.

16. An apparatus according to claim 15, wherein said energizing means is a coil spring which is wound around said first guide means on said head carriage, said coil spring acting so as to urge guide means in a direction for protruding said head toward said recording medium and also acting so as to energize said carriage in one of its moving direction.

* * * * *